(12) United States Patent
Thery et al.

(10) Patent No.: US 6,994,468 B2
(45) Date of Patent: Feb. 7, 2006

(54) HEAT FLUX COMPARATOR

(75) Inventors: Pierre Thery, Villeneuve d'Ascq (FR); Florian Raucoules, Lesquin (FR)

(73) Assignee: Captec, Villeneuve d'Ascq (FR)

( * ) Notice: Subject to any disclaimer, the term of this patent is extended or adjusted under 35 U.S.C. 154(b) by 30 days.

(21) Appl. No.: 10/496,908

(22) PCT Filed: Nov. 25, 2002

(86) PCT No.: PCT/FR02/04033

§ 371 (c)(1),
(2), (4) Date: May 27, 2004

(87) PCT Pub. No.: WO03/048707

PCT Pub. Date: Jun. 12, 2003

(65) Prior Publication Data

US 2005/0105582 A1    May 19, 2005

(30) Foreign Application Priority Data

Nov. 27, 2001  (FR) .................................. 01 15310

(51) Int. Cl.
*G01K 17/00* (2006.01)
*G01K 7/04* (2006.01)
(52) U.S. Cl. .................. 374/29; 374/179; 136/225
(58) Field of Classification Search ............... 374/29, 374/30, 43–45, 135, 137, 179; 136/213, 136/225, 236.1; 73/204.23, 204.24, 204.26
See application file for complete search history.

(56) References Cited

U.S. PATENT DOCUMENTS

| 3,708,667 A | 1/1973 | Denis et al. |
| 4,029,521 A | 6/1977 | Korn et al. |
| 4,382,154 A | 5/1983 | Thery et al. |
| 4,717,786 A | 1/1988 | Thery et al. |
| 4,850,713 A | 7/1989 | Thery et al. |
| 5,046,858 A * | 9/1991 | Tucker ........................ 374/179 |
| 5,059,543 A * | 10/1991 | Wise et al. .................. 136/225 |
| 5,288,147 A | 2/1994 | Schaefer et al. |
| 5,297,868 A * | 3/1994 | Graebner ....................... 374/44 |
| 5,623,119 A * | 4/1997 | Yater et al. .................. 136/225 |
| 5,909,004 A | 6/1999 | Hedengren et al. |
| 6,204,502 B1 * | 3/2001 | Guilmain et al. ........... 250/353 |

(Continued)

FOREIGN PATENT DOCUMENTS

EP    0555026 A1 *    8/1983

(Continued)

OTHER PUBLICATIONS

International search report for PCT/FR 02/04033.

*Primary Examiner*—G. Bradley Bennett
(74) *Attorney, Agent, or Firm*—McDonnell Boehnen Hulbert & Berghoff LLP

(57) ABSTRACT

The invention relates to a heat flux comparator comprising two substantially planar and mutually parallel input faces, capable of receiving each a heat flux, and comprising a thermoelectric circuit including at least a strip of a first metallic material partly covered on one of its surfaces with first separate metal pads of a second metallic material. The heat flux comparator also comprises layers of an insulating material arranged on either side of the thermoelectric circuit, second and third pads arranged on respective faces of the two layers of insulating material which are directed away from the thermoelectric circuit. The second and third pads are made of a same material and have substantially a same thickness, and the layers of insulating material have a same thickness too.

25 Claims, 5 Drawing Sheets

U.S. PATENT DOCUMENTS

| | | | |
|---|---|---|---|
| 6,238,085 B1 * | 5/2001 | Higashi et al. | 374/179 |
| 6,278,051 B1 * | 8/2001 | Peabody | 136/225 |
| 6,439,765 B2 * | 8/2002 | Smith | 374/43 |
| 6,698,283 B2 * | 3/2004 | Wado et al. | 73/204.26 |
| 2001/0012312 A1 * | 8/2001 | Smith | 374/31 |

FOREIGN PATENT DOCUMENTS

| | | | |
|---|---|---|---|
| EP | DE 196 23 377 | | 8/1998 |
| FR | 2 704 979 | | 11/1994 |
| JP | 5979823 A | * | 9/1984 |

* cited by examiner

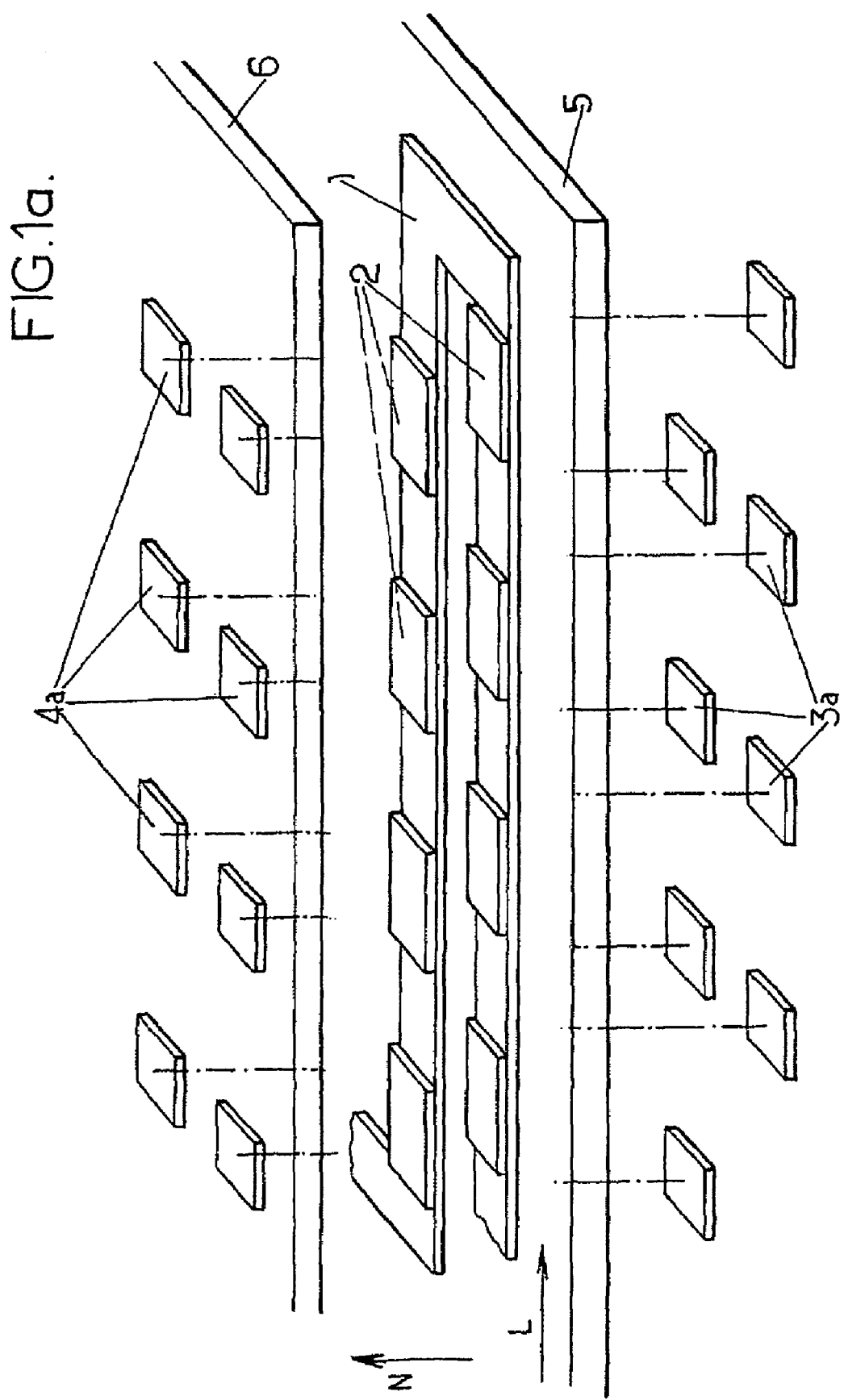

HEAT FLUX COMPARATOR

FIELD OF THE INVENTION

The present invention relates to devices for measuring heat flux, usually called heat fluxmeters.

It relates more particularly to a thermoelectric device capable of delivering an electrical signal when it receives a heat flux on at least one of its faces.

BACKGROUND OF THE INVENTION

U.S. Pat. No. 4,029,521 discloses an example of a thermoelectric detector which has the drawback of receiving only a single heat flux intended to be detected. In addition, this thermoelectric detector is necessarily associated with a support which has a particular function of extracting the heat flux received on the sensitive face of this device.

The object of the present invention is especially to alleviate these drawbacks by proposing a two-faced thermoelectric device capable of delivering an electrical signal that depends on the comparison between two heat fluxes received simultaneously on each of the two faces of the device respectively.

SUMMARY OF THE INVENTION

For this purpose, a heat flux comparator according to the invention possesses two input faces that are approximately plane and approximately parallel to each other, each able to receive a heat flux, and comprising, between the two input faces:

- a thermoelectric circuit having a defined longitudinal direction, comprising at least one approximately plane strip of a first metallic material possessing a defined thermal conductivity and a defined thermoelectric power, having at least two faces, partially covered on one of its faces with first separate metal pads made of a second metallic material possessing a thermal conductivity greater than that of the first metallic material and a thermoelectric power different from that of the first metallic material;
- two first layers of a first insulating material, which layers are placed on either side of the thermoelectric circuit in a direction orthogonal to the plane of the strip of first metallic material, this first insulating material possessing a thermal conductivity less than those of said first and second metallic materials;
- second and third pads placed on respective faces of said two first layers of first insulating material, which faces are directed away from the thermoelectric circuit and are placed relative to the first pads in order to form, with the latter, cells each comprising a first, a second and a third associated pad, said second and third associated pads of the same cell being placed approximately plumb, in said orthogonal direction, with two different longitudinal ends of said first pad of this cell.

According to the invention, said second and third associated pads are made of the same material and have approximately a same thickness along said orthogonal direction. Said two first layers of first insulating material furthermore have a same thickness along said orthogonal direction.

The term "insulating material" is understood to mean a material that is both electrically and thermally insulating. Such a material especially possesses a thermal conductivity at least ten times lower than that of the first metallic material and of the second metallic material. In particular, the first insulating material may be an organic material, a glass, mica, etc.

The heat flux comparator according to the invention has a construction that is partially symmetrical on either side of the thermoelectric circuit. Thanks to this property, the electrical signal delivered by the comparator depends on the comparison between the two incident heat fluxes received on each of its input faces respectively.

Under appropriate operating conditions of the heat flux comparator according to the invention, the two input faces are independent of each other and allow comparison of two independent heat fluxes incident on the two input faces respectively.

Furthermore, in this comparison, each of the two heat fluxes may be weighted by a controlled numerical factor. This numerical factor is, for example, fixed by the ratio of the respective areas of the second and third pads in a plane parallel to the plane of the strip of the thermoelectric circuit.

In a preferred embodiment of the heat flux comparator according to the invention, the second and third pads have identical dimensions, so that the electrical signal delivered by the comparator depends directly on the difference between the two heat fluxes. In addition, the two input faces then have a same dynamic response characteristic in relation to their respective heat fluxes.

It has been identified that, for this type of thermoelectric detector construction, the detected signal is related to the heat flow between the two input faces, resulting from the competition between the two incident heat fluxes. The first pads cooperate with the second and third pads which are mutually positioned so as to be offset along the longitudinal direction of the strip, which is perpendicular to the directions of the incident heat fluxes. Owing to their high thermal conductivity, the associated pads partly channel this heat flow along the direction of this offset. A localized temperature gradient at each longitudinal end of the first pads results from this channeling. Each first pad therefore generates an elementary electrical signal when the two heat fluxes are such that the temperature gradients at the two longitudinal ends of this first pad are not mutually compensated.

The first, second and third pads are arranged in such a way that the elementary electrical signals generated by all the respective first pads add together. Thus, the electrical signal delivered by the heat flux comparator between two ends of the strip of the thermoelectric circuit corresponds to the addition of these elementary electrical signals.

The first metallic material is, for example, constantan, copper or an alloy based on at least one of these metals.

In a first embodiment of the invention, the comparator is designed to receive a radiative heat flux on each of its input faces.

Said second and third pads may then be radiation reflectors. Advantageously, they are then made of a material selected for its radiation reflectivity, such as aluminum, silver, gold, chromium, copper or an alloy comprising at least one of these metals.

Alternatively, said second and third pads may be radiation absorbers. They are then made of a material selected for its radiation absorptivity, such as especially a chromium oxide or a mixed oxide of several metals.

In a second embodiment of the invention, the comparator is designed to receive a heat flux transmitted by contact, that is to say a conductive and/or convective heat flux, on each of its input faces.

It then furthermore includes two second layers of a second insulating material, each having at least two faces, which are placed against said two first layers of first insulating material respectively, on the side of those respective faces of said first layers that are directed away from the thermoelectric circuit, and covering the second or third pads respectively.

Said second and third pads are made of a material possessing a thermal conductivity greater than that of the layers of first insulating material and layers of second insulating material. This constituent material of said second and third pads is preferably a metallic material, such as copper, aluminum, silver, chromium, nickel and alloys comprising at least one of these metals.

In a preferred embodiment of a heat flux comparator, in which the fluxes are transmitted by contact with each of the two input faces, said second layers of second insulating material have a same thickness along said orthogonal direction.

In a variant of this preferred embodiment, the thickness of each said second layer of second insulating material is preferably greater than the thickness along said orthogonal direction of said first layer of first insulating material against which it is placed. Such a configuration specifically increases the precision in detection of the heat fluxes, especially by reducing the influence on the electrical signal delivered by the comparator of the nature of the supports external to the comparator that are in contact with its input faces.

In another embodiment of a comparator for heat fluxes transmitted by contact, the comparator includes two additional layers placed respectively on either side of the two said first layers of first insulating material.

These additional layers are in contact with said second and third pads respectively. Furthermore, between each of these additional layers and the first layer of first insulating material that is adjacent to it along said orthogonal direction, a volume of thermal insulation is provided between said second or third pads respectively.

A comparator for heat fluxes transmitted by contact may furthermore include a metallic layer placed on one of said second layers of second insulating material, against that face of said one of said second layers that is directed away from the thermoelectric circuit. This metallic layer improves the thermal contact of the comparator with an external support on the input face. It also allows the temperature on this input face to be made uniform by distributing the heat flux entering the comparator via this face. The precision of the electrical signal delivered is then improved. The two input faces may each have such a metal layer, so that the precision of the signal delivered is improved symmetrically with respect to the heat flux received by each of said input faces.

Optionally, the comparator may furthermore make use of any one or several of the following arrangements:

the thermoelectric circuit comprises several strips that are approximately plane and approximately parallel to one another, superposed along said orthogonal direction and separated from each other by at least one layer of insulating material, each strip being provided with first pads placed in such a way that the first pads of all the strips are plumb with one another along said orthogonal direction;

the heat flux comparator may be associated on at least one of its input faces with a support and it furthermore includes, on this input face, a material for thermal contact with the support;

the heat flux comparator furthermore incorporates a thermocouple for temperature measurement;

the thermocouple is formed by two strips made of different first and second metallic materials respectively, these two strips being electrically isolated from said thermoelectric circuit(s) and in contact with each other.

The invention also relates to the use of a heat flux comparator as defined above to compare two heat fluxes received on each of its two input faces respectively.

It also relates to the use of such a heat flux comparator for generating an electrical current between connections that connect ends of the metal strip or strips of said thermoelectric circuit or circuits of this heat flux comparator to an external electrical device.

BRIEF DESCRIPTION OF THE DRAWINGS

In the drawings:

FIG. 1a is an exploded partial view in perspective of a radiative heat flux comparator according to the invention;

DESCRIPTION OF PREFERRED EMBODIMENTS

In the various figures, identical references denote identical elements. In these figures and with respect to a vertical axis N orthogonal to the mean plane of the comparators shown, the terms "lower" and "upper" will be used to denote elements placed relative to one another along this vertical axis N. To make the figures easier to examine, the dimensions have been modified relative to those of the actual devices, without preserving their relative proportions.

Figure 1B:
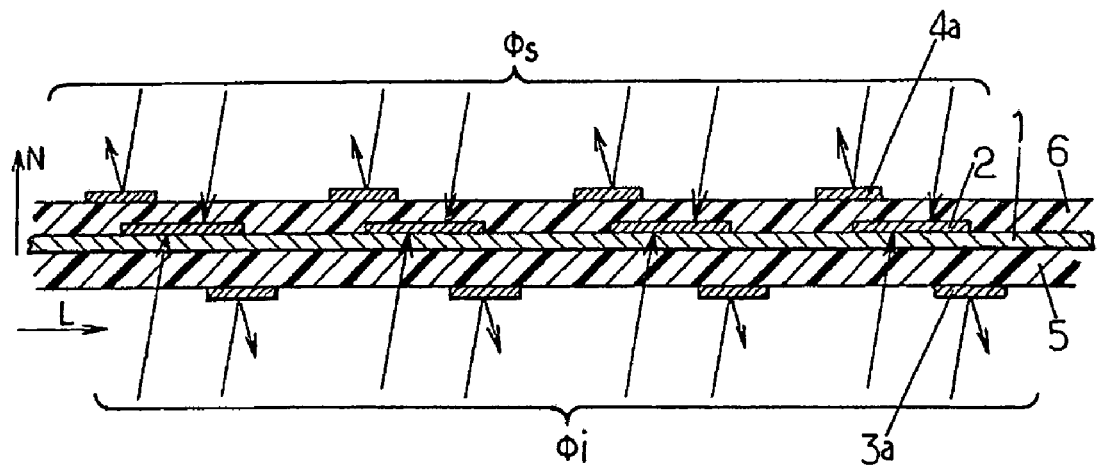
FIG. 1b is a sectional view of the same radiative heat flux comparator, showing the radiative heat fluxes incident on the two input faces.

FIGS. 1a and 1b show a radiative heat flux comparator, in perspective and in cross section respectively. This comparator consists of a flat strip 1 meandering in a longitudinal direction L; it is made of constantan metal and is partly covered on its upper face with rectangular copper pads 2. The strip 1 has a thickness of between 5 microns and 25 microns, for example 25 microns, and a width of 0.3 millimeters. The pads 2 have a length of 2 millimeters, a width of 0.3 millimeters and a thickness of 5 microns. Two successive pads 2 along the strip 1 are separated from each other by 2 millimeters. In general, the performance of the comparator is better when the distance between two successive pads 2 along the strip 1 is identical to the length of the pads 2.

The thermal conductivity of the constantan strip 1 is approximately 20 W/m° C. and that of the pads 2 approximately 400 W/m° C.

Advantageously, the pads 2 have received a surface treatment, for example of the oxidation or sulfurization type, so as to make them particularly absorbent to radiation incident on their surface.

The strip 1 provided with pads 2 is inserted between two identical plastic, for example Kapton, films 5,6 having a thickness of between 25 microns and 120 microns, for example 50 microns.

Aluminum reflectors 3a and 4a are placed on either side of these two films 5, 6, beneath and above the ends of the rectangular copper pads 2 respectively, each pad 2 having a reflector 3a below and a reflector 4a above its two opposed edges oriented perpendicular to the longitudinal direction of the strip 1. These reflectors 3a, 4a have for example a thickness of between 0.01 microns and 30 microns, a width of 0.3 millimeters and a length of 2 millimeters. The long sides of a reflector 3a, 4a are parallel to the long sides of the pad 2 with which it is associated in one and the same cell, and the reflector 3a, 4a is centered on one of the short sides of this pad 2.

The pads 2 may be advantageously placed so as to be mutually offset between two adjacent and parallel parts of the strip 1 forming an outward leg and a return leg of the same meander of the strip 1, with an offset along the longitudinal direction L of this meander. When this offset is equal to the length of the pads 2, which itself is equal to the length between two successive pads along the longitudinal direction L, the reflectors 3a are aligned with the lines perpendicular to the meanders, and likewise the reflectors 4a, in their respective planes. The reflectors 3a and 4a can then be grouped together along these lines to form continuous bands, thereby further increasing the sensitivity of the heat flux comparator.

FIG. 1b illustrates schematically the behavior of two radiative heat fluxes, namely the lower heat flux $\Phi_i$ and the upper heat flux $\Phi_s$, that are incident on the lower face of the film 5 and on the upper face of the film 6 respectively. The respective faces of these films 5, 6 constitute the input faces of the comparator. Each incident radiative flux $\Phi_i$, $\Phi_s$ is reflected off the reflectors 3a and 4a in such a way that one of the ends of each pad 2 receives the lower radiative flux $\Phi_i$, while the other end of the same pad receives the upper radiative flux $\Phi_s$. Depending on which of these two radiative fluxes is the larger, a heat current flows in each pad 2 in the longitudinal direction of each pad 2, producing, at each end of the pads 2, an elementary contribution to the electrical signal delivered by the comparator. The contributions of all the pads 2 are added to or subtracted from one another, depending on the position—lower or upper—of the reflector 3a or 4a corresponding to the end of the pad 2 making the elementary contribution.

Such a radiative heat flux comparator may be suspended vertically so as to compare, without any contact, two thermal radiation fluxes incident on either side of the comparator. Depending on the source or sources of these two incident thermal radiation fluxes, they may be independent of each other or partially correlated with each other, but they are detected by the comparator independently of each other.

It has also been observed that the electrical signal delivered by such a radiative heat flux comparator depends only on the radiative fluxes $\Phi_i$ and $\Phi_s$ incident on the two input faces, independently of the intrinsic temperature of the heat flux comparator. This intrinsic temperature of the comparator depends on other parameters, especially the position of the comparator relative to the conductive and/or convective heat fluxes, without its variations causing variations in the electrical signal delivered.

Figure 2:
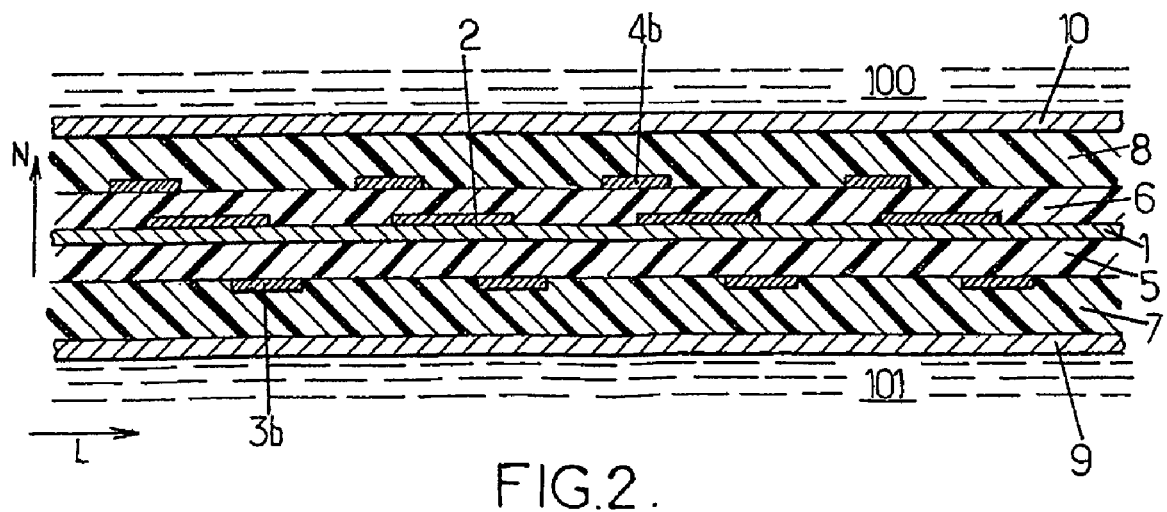
FIG. 2 shows a comparator for heat fluxes transmitted by thermal contact.

FIG. 2 is a sectional view of a contact-transmitted heat flux comparator. It comprises, as previously, a constantan strip 1 having similar dimensions, which is partially covered with rectangular copper pads 2 that also have the same dimensions as previously, and is inserted between the same films 5 and 6.

The thermally conducting elements 3b and 4b are placed vertically in line with the edges of each pad 2, in the same arrangement as that of the reflectors 3a and 4a of the radiative flux comparator described above, but as substitutes for these reflectors 3a and 4a. They are made of copper for example and have the following dimensions: length 1.5 millimeters; width 0.3 millimeters; and thickness 30 microns. The conducting elements 3b are placed between the Kapton film 5 and an additional Kapton film 7. The conducting elements 4b are placed in the same way between the Kapton film 6 and an additional Kapton film 8. The films 5 and 6 have the same thickness of 50 microns, and the films 7 and 8 have the same thickness of 120 microns. The lower face of the film 7 and the upper face of the film 8 constitute the two input faces of the comparator.

This heat flux comparator is used between two supports 100 and 101 which communicate to it, by contact, two heat fluxes on its respective input faces. To improve the thermal contacts between the supports 100 and 101 and the films 7 and 8 respectively, these films are each covered with respective metal layers 9 and 10 on their faces directed away from the strip 1. These metal layers, preferably made of a soft metal and having a thickness of between 0.01 microns and 100 microns, ensure that each contacting heat flux is distributed over the entire surface of each of the input faces of the comparator. An additional layer of thermal contact material, not shown in FIGS. 2 and 3, may be placed between the metal layers 9 and 10 and the supports 100 and 101. For this additional thermal contact material, it is advantageous to use a gel capable of penetrating the anfractuosities present at the surface of the metal layers 9 and 10, and also those present on the surface of the supports 100 and 101.

Figure 3:
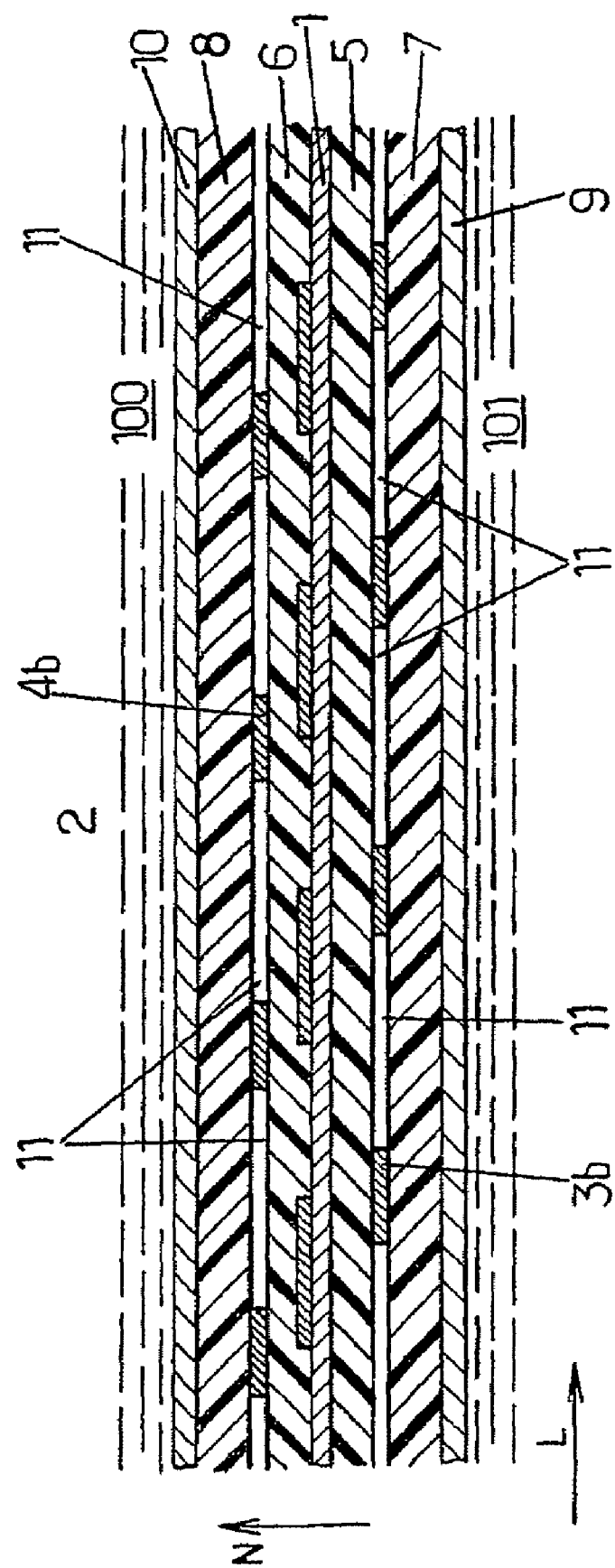
FIG. 3 shows another variant of a comparator for heat fluxes by thermal contact according to the invention.

The contact-type heat flux comparator of FIG. 3 is identical to that of FIG. 2, except that the thermally conducting elements 3b and 4b have a greater thickness, for example 70 microns. In this way, the Kapton films 5 and 7 are not directly in contact with each other, being kept apart at regularly spaced intervals by the elements 3b. Likewise, the Kapton films 6 and 8 are not in direct contact with each other either, these being kept apart by the elements 4b. Volumes of thermal insulation 11, empty of solid material, are thus left between the films 5 and 7 on the one hand, and between the films 6 and 8 on the other, surrounding the conducting elements 3b and 4b respectively. Such a configuration improves the sensitivity of the comparator by increasing the concentration of the heat current around the ends of the pads 2.

Figure 4:
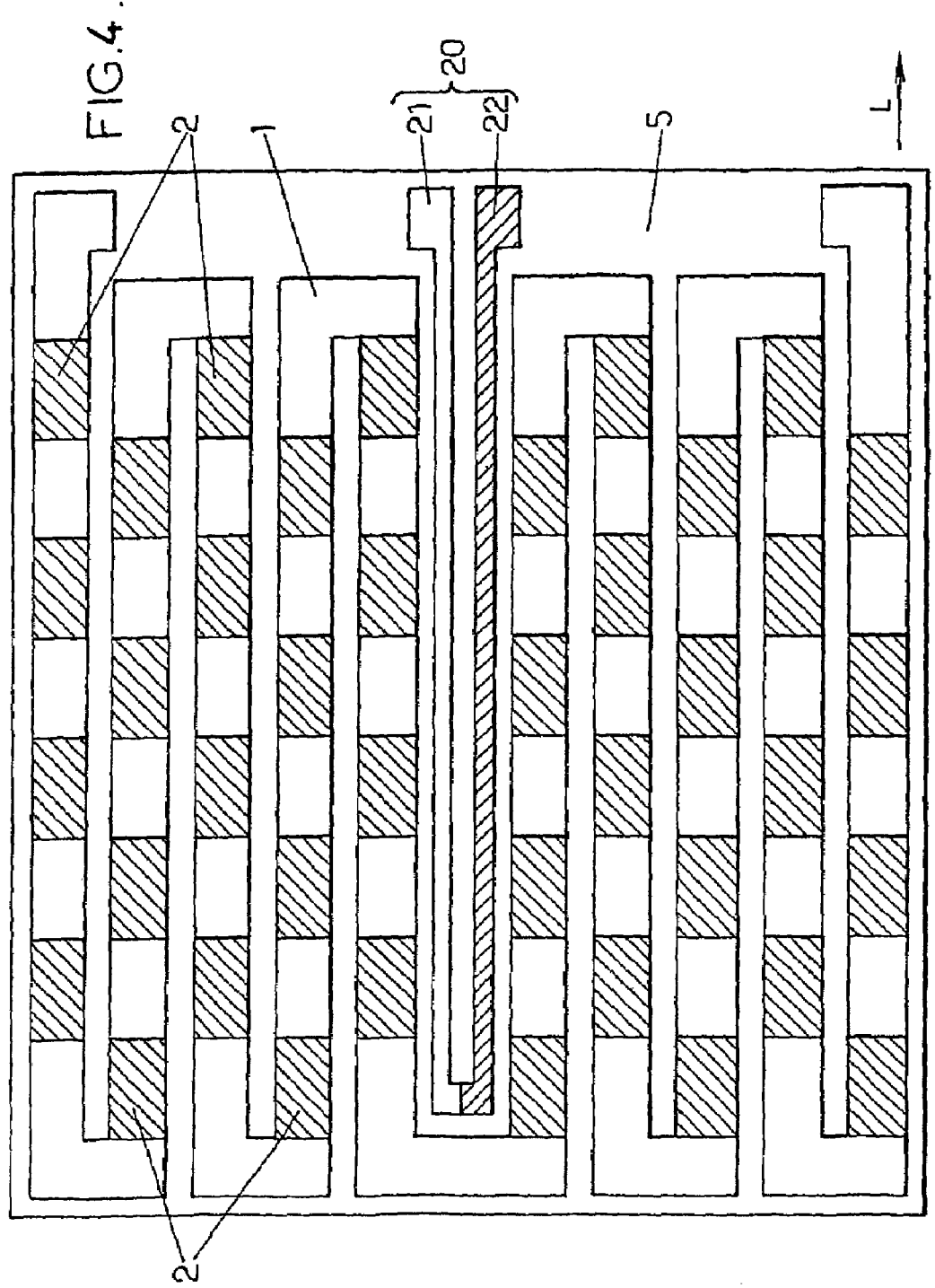
FIG. 4 illustrates an arrangement of the thermoelectric circuit on the surface of a first layer of first insulating material, combined with the provision of a thermocouple.

FIG. 4 shows in its entirety a thermoelectric circuit comprising a conducting strip 1 as described above. It is in the form of parallel meanders inscribed within a square or rectangular overall outline, for example a square of 3 centimeters a side. This strip 1 has the copper pads 2 on its upper surface and is itself applied against the upper surface of the Kapton film 5. Placed in the middle of its meanders is a thermocouple 20 composed of two parts 21, 22, made of two different metallic materials respectively. These two metallic materials possess different respective thermoelectric powers. The part 21 is, for example, made of constantan and part 22 is, for example, made of copper. These two parts 21, 22 are in contact at one of their respective ends 23, 24 so as to form a thermocouple capable of delivering an electrical voltage that depends on the temperature within the comparator comprising such an arrangement. Moreover, this electrical voltage is detected between two other respective ends 25, 26 of the parts 21, 22.

One particular advantage of these embodiments is the simplicity of manufacture of such heat flux comparators, their low manufacturing cost and the ease of implementation of these comparators. This is because the metal pads may be produced by electroplating from liquid solutions containing, in the form of dissolved ions, the metals intended to constitute these pads. The manufacturing process therefore comprises simple steps, for example such electroplating, the positioning and removal of masks, chemical etching steps, the cutting of plastic and/or metal films, and the assembly of superposed layers.

Implementation of a heat flux comparator such as those corresponding to the above embodiments may correspond to different uses.

A first use is the detection and comparison of radiative heat fluxes or heat fluxes exchanged by contact between two media. To do this, two ends of the strip 1 are connected to the terminals of a meter for measuring electrical voltage. The value of the voltage indicated by this meter is then a measurement of the difference between the heat fluxes received by the respective two input faces of the comparator. Each of the two source media of the heat fluxes may be a solid support, but also a fluid, liquid, gaseous or flexible medium, and especially a biological medium. The two source media are not necessarily identical to each other. If one of these two source media is transparent to the radiation, it can transmit a radiative heat flux to one of the faces of the comparator. In such a case, the other source medium can transmit a heat flux to the comparator, either by contact or in the form of radiation. No metal layer 9/10 is then placed on the input face or faces intended to receive a radiative heat flux, but only, and optionally, on that input face or faces of the comparator intended to receive only a heat flux transmitted by contact.

One particular case of this first use is the detection of thermal phenomena, such as the condensation or evaporation of moisture, occurring on at least one of the two input faces of the comparator. To do this, a contact-transmitted heat flux comparator according to the invention is, for example, placed on a cold support, one of its two input faces being in contact with this support. Its other input face is advantageously covered with a blotter capable of reversibly absorbing a certain amount of moisture. This moisture can condense in the blotter, or evaporate under the effect of any external influence. Such condensation and such evaporation are detected by the heat flux comparator as, respectively, an increase and a decrease in heat flux received by contact at the input face covered by the blotter with respect to the input face in contact with the support. Such a use, permitted by the sensitivity of the heat flux comparator, is especially suitable for checking the refrigeration system for the provisioning of food products.

A second use is the production of an electrical current intended to supply an electrical device external to the comparator. In this case, the ends of the strip 1 are connected to two supply terminals of the electrical device.

Figure 5:
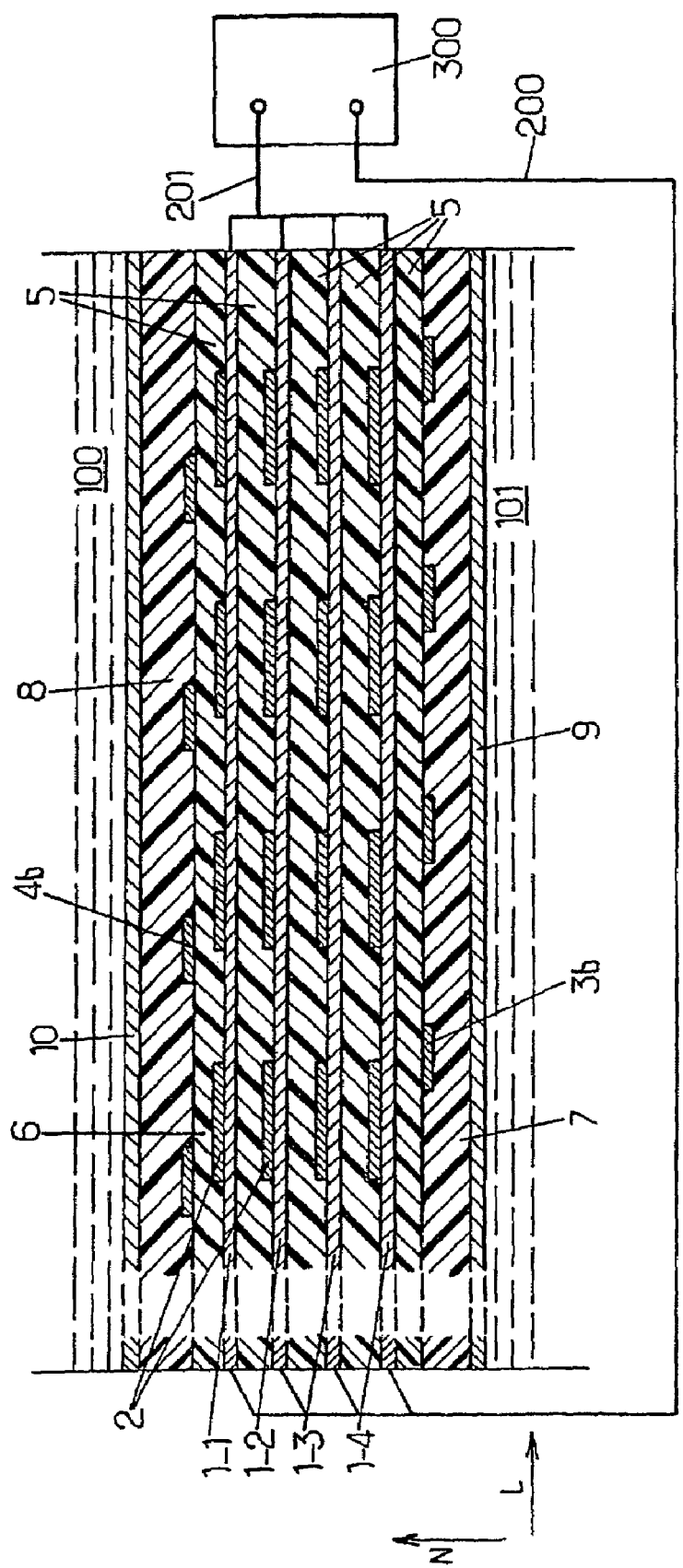
FIG. 5 shows a heat flux comparator according to the invention used as an electrical current generator and connected to an electrical device.

For this electrical current production application, the comparator may advantageously comprise several, for example four, metal strips labeled 1-1, 1-2, 1-3 and 1-4 in FIG. 5. These strips equipped with copper pads 2 are identical to one another and superposed to form a stack. According to FIG. 5, two successive strips in this stack are separated by a plastic film 5, such as a Kapton film, for example 50 microns in thickness. They are arranged in such a way that the pads 2 of each circuit are positioned vertically in line with the pads 2 of the lower circuit of the stack. Conducting elements 3b, 4b, and also Kapton films 7, 8 and metal layers 9, 10, are placed on either side of the stack in order to complete the comparator. The metal layers 9, 10 cover the input faces of the comparator and are in contact with two supports 100, 101, which transmit two heat fluxes to the comparator.

Electrical connections 200, 201 connect the ends of the strips 1-1, 1-2, 1-3, 1-4 together, so as to electrically connect them up as a parallel circuit, as shown in FIG. 5, or as a series circuit, or a mixed parallel/series electrical circuit. They also connect them to the input terminals of the external electrical device 300. The connections 200, 201 are placed in such a way that the comparator thus connected to the device 300 supplies the latter with an electrical current and an electrical voltage that are adapted to its consumption.

What is claimed is:

1. A heat flux comparator having two input faces that are approximately plane and approximately parallel to each other, each able to receive a heat flux, and comprising, between the two input faces:

a thermoelectric circuit having a defined longitudinal direction, comprising at least one approximately plane strip of a first metallic material possessing a defined thermal conductivity and a defined thermoelectric power, having at least two faces, partially covered on one of its faces with first separate metal pads made of a second metallic material possessing a thermal conductivity greater than that of the first metallic material and a thermoelectric power different from that of the first metallic material;

two first layers of a first insulating material, which layers are placed on either side of the thermoelectric circuit in a direction orthogonal to the plane of the strip of first metallic material, this first insulating material possessing a thermal conductivity less than those of said first and second metallic materials;

second and third pads placed on respective faces of said two first layers of first insulating material, which faces are directed away from the thermoelectric circuit and are placed relative to the first pads in order to form, with the latter, cells each comprising a first, a second and a third associated pad, said second and third associated pads of the same cell being placed approximately plumb, in said orthogonal direction, with two different longitudinal ends of said first pad of this cell, wherein said second and third associated pads are made of the same material and have approximately a same thickness along said orthogonal direction and wherein said two first layers of first insulating material have a same thickness along said orthogonal direction.

2. The heat flux comparator as claimed in claim 1, wherein said second and third pads are radiation reflectors.

3. The heat flux comparator as claimed in claim 2, wherein said second and third pads are made of a material selected from the list comprising aluminum, silver, gold, chromium, copper and alloys comprising at least one of these metals.

4. The heat flux comparator as claimed in claim 1, wherein said second and third pads are radiation absorbers.

5. The heat flux comparator as claimed in claim 1, which furthermore includes two second layers of a second insulating material, each having at least two faces, which are placed against said two first layers of first insulating material respectively, on the side of those respective faces of said first layers that are directed away from the thermoelectric circuit, and covering the second or third pads, and wherein said second and third pads are made of a material possessing a thermal conductivity greater than that of the layers of first insulating material and layers of second insulating material.

6. The heat flux comparator as claimed in claim 5, wherein the constituent material of said second and third pads is a metallic material.

7. The heat flux comparator as claimed in claim 6, wherein the constituent material of said second and third pads is selected from the list comprising copper, aluminum, silver, chromium, nickel and alloys comprising at least one of these metals.

8. The heat flux comparator as claimed in claim 5, wherein said second layers of second insulating material have a same thickness along said orthogonal direction.

9. The heat flux comparator as claimed in claim 5, wherein said second layers of second insulating material each have a thickness along said orthogonal direction greater than the thickness along said orthogonal direction of said first layer of first insulating material against which it is placed.

10. The heat flux comparator as claimed in claim 5, which furthermore includes a first metallic layer placed on one of said second layers of second insulating material, against that face of said one of said second layers that is directed away from the thermoelectric circuit.

11. The heat flux comparator as claimed in claim 5, which furthermore includes two metallic layers placed against said second layers of second insulating material respectively, against those faces of said second layers that are directed away from the thermoelectric circuit.

12. The heat flux comparator as claimed in claim 1, which further includes two additional layers placed on either side of the two said first layers of first insulating material respectively, wherein these additional layers are in contact with said second and third pads respectively and wherein, between each additional layer and said first layer of first insulating material that is adjacent to it along said orthogonal direction, a volume of thermal insulation is provided between said second or third pads respectively.

13. The heat flux comparator as claimed in claim 12, which furthermore includes a first metallic layer placed on one of said second layers of second insulating material, against that face of said one of said second layers that is directed away from the thermoelectric circuit.

14. The heat flux comparator as claimed in claim 12, which furthermore includes two metallic layers placed against said second layers of second insulating material respectively, against those faces of said second layers that are directed away from the thermoelectric circuit.

15. The heat flux comparator as claimed in claim 1, wherein the first metallic material is based on constantan.

16. The heat flux comparator as claimed in claim 1, wherein the first metallic material is based on copper.

17. The heat flux comparator as claimed in claim 1, wherein the second metallic material is selected from the list comprising copper, gold, silver, nickel and alloys comprising at least one of these metals.

18. The heat flux comparator as claimed in claim 1, wherein the thermoelectric circuit comprises several strips that are approximately plane and approximately parallel to each other, superposed along said orthogonal direction and separated from each other by at least one layer of insulating material, each strip being provided with first pads placed in such a way that the first pads of all the strips are plumb with one another along said orthogonal direction.

19. The heat flux comparator as claimed in claim 5, which may be associated on at least one of its input faces with a support, and which furthermore includes, on this input face, a material for thermal contact with the support.

20. The heat flux comparator as claimed in claim 12, which may be associated on at least one of its input faces with a support, and which furthermore includes, on this input face, a material for thermal contact with the support.

21. The heat flux comparator as claimed in claim 1, which furthermore incorporates a thermocouple for temperature measurement.

22. The heat flux comparator as claimed in claim 21, wherein the thermocouple is formed by two strips made of different first and second metallic materials respectively, these two strips being electrically isolated from said thermoelectric circuit(s) and in contact with each other.

23. The use of a heat flux comparator as claimed in claim 1 for comparing two incident heat fluxes that are received on each of its two input faces respectively.

24. The use of a heat flux comparator as claimed in claim 1 for detecting a thermal phenomenon occurring at least one of the two input faces of the comparator.

25. The use of a heat flux comparator as claimed in claim 1 for generating an electrical current between connections that connect ends of the metal strip or strips of said thermoelectric circuit or circuits of this heat flux comparator to an external electrical device.

* * * * *